2,910,502

PROCESS FOR THE PRODUCTION OF ALIPHATIC NITRILES

Raymond I. Hoaglin, South Charleston, Henry C. Schultze, Charleston, and Charles E. Hodges, South Charleston, W. Va., assignors to Union Carbide Corporation, a corporation of New York No Drawing. Application March 1, 1957
Serial No. 643,219

9 Claims. (Cl. 260—465.2)

This invention relates to a process for the production of aliphatic nitriles. More particularly, the present invention relates to an improved process for the production of aliphatic nitriles from the corresponding amides.

One method which is presently used for the preparation of aliphatic nitriles involves a liquid phase process wherein the ammonium salt of an organic acid is dehydrated to form the corresponding amide, which is thereafter dehydrated to form the corresponding nitrile. This liquid phase process, which has been conducted in the presence of catalysts such as phosphoric acid, has not been completely satisfactory. Included among the disadvantages of this process are the low production rates that are obtainable and the low reaction efficiency which results due to decomposition of the ammonium salt and subsequent removal of by-product ammonia with the nitrile. If phosphoric acid or materials which produce phosphoric acid under the conditions of the reaction are used as catalysts, considerable corrosion of metal equipment can also occur.

Another method which is now employed for the preparation of nitriles involves reacting ammonia and an organic acid in the vapor state over a fixed bed of a solid catalyst, such as alumina or silica gel, to form the desired nitrile and water. This method also results in generally low yields and production rates of the desired nitrile. When this method of operation with a fixed bed of catalyst is used the process must frequently be shut down in order to recharge or to regenerate the catalyst. In addition, it is difficult using this method to obtain good heat transfer and uniform contact between the reactant gases and the catalyst. Furthermore, this method of operation does not permit the use of horizontal gas-fired reaction vessels, but must be conducted in less efficient vertical reaction vessels, in order to insure complete filling of each reaction vessel with catalyst.

We have discovered an improved process for the production of aliphatic nitriles which is superior to any of the known methods described above. By utilizing the process of our invention, high quality nitriles are easily and economically obtained in high yields and with high efficiencies. The process of our invention utilizes a homogeneous catalyst and permits the use of efficient horizontal gas-fired tubular reactors. Furthermore, our process provides better heat transfer and better contact between reactants and catalyst, in addition to eliminating the need for the periodic shutdowns that would otherwise be necessary to replace or to regenerate the catalyst. In addition, the present process eliminates the corrosion problems which are encountered in certain of the presently known methods for the production of nitriles.

The process of the present invention comprises contacting an aliphatic amide at a temperature of from 400° to 1000° C., and preferably from 650° to 850° C., and a pressure of from about 1 mm. Hg to about 8 atmospheres, and preferably atmospheric pressure, with a trialkyl phosphate catalyst to convert the amide to the corresponding nitrile.

Aliphatic amides containing as many as 18 carbon atoms may be used in the process of the present invention. However, the invention is particularly applicable to aliphatic amides represented by the general formula: $R-CONH_2$, wherein R is an alkyl radical containing from 1 to 10 carbon atoms, inclusive. Illustrative of such amides are acetamide, propionamide, n-butyramide, iso-butyramide, valeramide, hexanamide and 2-ethylhexanamide.

Trialkyl phosphates which are suitable for use as catalysts in accordance with the present invention may be represented by the formula $(R'O)_3PO$, wherein R' is an alkyl group containing from 2 to 10 carbon atoms, inclusive. Illustrative of such phosphates are triethyl phosphate, tri(n-propyl) phosphate, triisopropyl phosphate, tri(n-butyl) phosphate, triisobutyl phosphate, tripentyl phosphate, trihexyl phosphate, triheptyl phosphate and tri(2-ethylhexyl) phosphate. A particularly preferred catalyst is triethyl phosphate.

The catalyst may be present during the reaction in a concentration (based on the amide) of from about 0.005 percent by weight to about 5 percent by weight, but is preferably present in a concentration of from about 0.1 percent by weight to about 0.7 percent by weight.

The contact time for the reaction can be varied between about 0.1 and 30 seconds or longer. Preferably, however, the contact time should be between 0.5 and 12 seconds. As used herein, contact time is the free volume of the reactor, divided by the reactant flow rate, in consistant units. The reactant flow rate is calculated for a vapor under reaction conditions and assuming the vapor behaves as an ideal gas.

In order to illustrate the advantages of the present invention a series of eight experiments was conducted. Experiments II through VII illustrate the present invention. Experiments I and VIII were conducted for comparison and are outside the scope of the present invention.

EXPERIMENT I

A feed containing 63 weight percent acetamide, 24 weight percent acetic acid, 2 weight percent ammonium acetate and the remainder water was fed continuously at the rate of 1129 grams per hour to a tubular vaporizer. The feed contained no triethyl phosphate or other catalyst. Essentially all of the feed was vaporized at atmospheric pressure, and the vapors were passed through a clean 1.0-inch I.D. x 60-inch, type 316 stainless steel tubular reactor which was heated to 750° C. The liquid feed rate was sufficient to give a residence time in the reactor of 1.5 seconds. The effluent from the reactor entered a water-cooled condenser, where those components of the reaction product which boiled above approximately 30° C. were condensed and collected. The uncondensed vapors were metered and discharged. Over a period of one hour the average rate of formation of uncondensed vapors was 3.70 cubic feet per hour as measured at 20° C. and one atmosphere. The liquid product collected over a one-hour interval was distilled to obtain an acetonitrile-water fraction, and the acetonitrile content of the fraction was determined by chemical analysis to be 76 percent by weight. The yield of acetonitrile, based on the acetamide fed, was 21 percent.

EXPERIMENT II

Sufficient triethyl phosphate to give a concentration of 0.18 percent by weight was admixed with a feed material of the same composition employed in Experiment I. This mixture was fed continuously at the rate of 1156 grams per hour to the pyrolysis system described in Experiment I. Reaction conditions were identical to those in Experiment I and included a reactor temperature of 750° C. and a residence time of 1.5 seconds at atmospheric pressure. This experiment was initiated immediately after the completion of the experiment cited as Experiment I. No intervening experiments which might have affected the condition of the reactor liner were performed. Over a period of 1.5 hours the average rate of formation of uncondensed vapors was 0.66 cubic feet per hour as measured at 20° C. and one atmosphere. The liquid product collected during the experiment was distilled to obtain an acetonitrile-water fraction, and the acetonitrile content of the fraction was determined by chemical analysis to be 80 percent by weight. The yield of acetonitrile, based on the acetamide fed, was 92 percent.

EXPERIMENT III

A feed mixture containing 59 weight percent acetamide, 21 weight percent acetic acid, 3 weight percent ammonium acetate and the remainder water was fed continuously at the rate of 2370 grams per hour to the pyrolysis system described in Experiment I. The feed also contained 0.48 percent by weight triethyl phosphate. Reaction conditions included a temperature of 850° C. and a contact time of 0.5 second at atmospheric pressure. Over a period of 4 hours the average rate of formation of uncondensed vapors was 1.77 cubic feet per hour as measured at 20° C. and one atmosphere. The liquid product collected during the experiment was distilled to obtain an acetonitrile yield, based on the acetamide fed, of 87 percent.

EXPERIMENT IV

Sufficient triethyl phosphate to give a concentration of 0.48 percent by weight was added to a feed comprising 43 weight percent butyramide, 3 weight percent ammonium butyrate, 17 weight percent butyric acid and the remainder water. The resulting mixture was fed to an unpacked tubular reactor similar to that described in Experiments I–III. The reactor was heated by a molten lead bath. The feed rate was sufficient to give a contact time of approximately 10 seconds at a pressure of 1 atmosphere. An experiment of 10 hours' duration, in which 1200 grams of crude butyramide were fed, was conducted at a temperature of 625° C. A liquid product weighing 1186 grams and composed of two layers was obtained. Approximately 11 s.c.f.h. of decomposition gases, which were uncondensed at 20° C., were evolved.

The liquid product from the pyrolysis was distilled at atmospheric pressure and a distillate composed of two liquid phases was obtained; the upper (nitrile) phase was decanted and collected, and a lower (water) phase was returned to the column. The distillation was terminated when an upper layer ceased to appear in the distillate. Chemical analyses indicated that the distillation product contained 92 percent butyronitrile, 2 percent ammonium butyrate, 2 percent butyric acid, and a small quantity of water. Examination with the mass and infrared spectrometers revealed the characteristic patterns of butyronitrile.

Calculations, based on chemical analyses of the amide fed to the pyrolysis system, the once-distilled nitrile, and the distillation residue, indicated a butyramide conversion of 65 percent at an efficiency to butyronitrile of 94 percent. A butyronitrile productivity of 2.4 pounds per cubic foot per hour was realized.

EXPERIMENT V

Sufficient triethyl phosphate was added to a feed comprising 36 weight percent 2-ethylhexanamide, 3 weight percent ammonium 2-ethyl-hexanoate, 57 weight percent 2-ethylhexanoic acid, and the remainder water to give a concentration of triethyl phosphate of 0.48 percent by weight. This mixture was fed to an unpacked heated reactor similar to that described in Experiment I at a rate sufficient to give a contact time of approximately 10 seconds at atmospheric pressure. The reactor was maintained at a temperature of 650° C. A total of 995 grams of crude 2-ethylhexanamide, containing 0.48 percent triethyl phosphate, was fed over a two-hour period and 651 grams of product were recovered. Decomposition gases, uncondensed at 20° C. and measuring approximately 7 standard cubic feet per hour, were produced.

Distillation of the above product produced a distillate having two layers. The upper layer was removed as rapidly as it formed, and the lower layer was returned to the column. A distillation pressure of 50 to 100 millimeters was maintained. The distillation was terminated when an upper layer ceased to appear in the distillate. Chemical analyses indicated that the distillation product contained approximately 81 percent 2-ethylhexanonitrile, 2 percent ammonium 2-ethylhexanoate, 5 percent 2-ethylhexanoic acid, and water. Examination of the material with the mass and infrared spectrometers indicated the characteristic patterns of 2-ethylhexanonitrile.

Calculations, based on chemical analyses of the amide fed to the pyrolysis system, the once-distilled nitrile, and the distillation residue, indicated a conversion of 2-ethylhexanamide of 89 percent at an efficiency to 2-ethylhexanonitrile of 84 percent. The productivity of 2-ethylhexanonitrile was 10.3 pounds per cubic foot per hour.

EXPERIMENTS VI–VIII

In these three experiments the equipment used for the pyrolysis was substantially the same as that described in Experiment I. Feed solutions were prepared by dissolving 450 grams of acetamide (Mallinckrodt technical grade) in 225 grams of water. In the case of tributyl phosphate, the desired quantity of catalyst was then added to a portion of the aqueous acetamide solution, and the resulting mixture was fed at the required rate. In the case of tri(2-ethylhexyl) phosphate, because of its insolubility in the aqueous acetamide, the required amounts of catalyst and amide solution were pumped separately but simultaneously to the reactor tube.

The crude product of the pyrolysis was distilled through a 25 x 650-millimeter column packed with 0.24 x 0.24-inch protruded stainless steel packing. A constant boiling mixture of acetonitrile-water was removed at a vapor temperature of 74° C. to 82° C. with the reflux ratio maintained at 5 to 1. This fraction was analyzed for water and for acetonitrile. The kettle residue was analyzed for acetamide. Yields, efficiencies, and conversions are based on these analyses.

Experiment VIII, which was performed without the addition of catalyst, was preceded by cleansing of the reactor to remove phosphate and carbon deposits from the reactor wall. This cleaning procedure involved (a) scraping of the reactor wall with a stiff wire brush and then (b) burning with a stream of air at 600° C. for approximately one hour or longer.

The pertinent conditions and the results of these three experiments are given in the following table.

Table.—*Production of acetonitrile by the vapor-phase pyrolysis of acetamide*

Reactor: 1.0 x 56-inch schedule 40, type 316 stainless steel interliner in a 1.25 x 56-inch type of 347 stainless steel jacketed pipe.
Heat exchange: Molten lead in jacket, heated by electrical wiring.
System pressure: Atmospheric.
Temperature: 650° C.
Contact time: 5 seconds.
Feed: Synthetic mixture of 450 grams of acetamide in 225 milliliters of water.

| Exp. No. | Catalyst | Catalyst Concentration [a] | Conversion Acetamide, percent | Yield of acetonitrile, percent | Efficiency to acetonitrile, percent | Productivity [b] |
|---|---|---|---|---|---|---|
| VI | Tributyl phosphate | 2.0 | 99 | 95 | 96 | 7.2 |
| VII | Tri(2-ethylhexyl) phosphate | 3.0 | 88 | 87 | 99 | 7.3 |
| VIII | None | | | 39 | | 3.2 |

[a] Weight percent based on aqueous acetamide feed.
[b] Pounds of acetonitrile per hour per cubic foot of reactor volume.

We claim:

1. A process for the production of an aliphatic mononitrile which comprises heating at a temperature of from about 400° to about 1000° C. and aliphatic amide having the formula R—CONH$_2$, wherein R is an alkyl radical containing from 1 to 18 carbon atoms, in the presence of from 0.005 to 5.0 percent by weight, based on the amide, of a homogeneous catalyst having the formula (R'O)$_3$PO, wherein R' is an alkyl group containing from 2 to 10 carbon atoms, inclusive, said process being conducted in the vapor phase with a contact time of from about 0.1 to 30 seconds.

2. A process for the production of an aliphatic mononitrile which comprises heating at a temperature of from about 400° to about 1000° C. an aliphatic amide having the formula R—CONH$_2$, wherein R is an alkyl radical containing from 1 to 10 carbon atoms, in the presence of from 0.005 to 5.0 percent by weight, based on the amide, of a homogeneous catalyst having the formula (R'O)$_3$PO, wherein R' is an alkyl group containing from 2 to 10 carbon atoms, inclusive, said process being conducted in the vapor phase with a contact time of from about 0.1 to 30 seconds.

3. A process for the production of an aliphatic mononitrile which comprises heating at a temperature of from about 650° C. to about 850° C. an aliphatic amide having the formula R—CONH$_2$, wherein R is an alkyl radical containing from 1 to 10 carbon atoms, in the presence of from 0.005 to 5.0 percent by weight, based on the amide, of a homogeneous catalyst having the formula (R'O)$_3$PO, wherein R' is an alkyl group containing from 2 to 10 carbon atoms, inclusive, said process being conducted in the vapor phase with a contact time of from about 0.1 to 30 seconds.

4. A process for the production of acetonitrile which comprises heating acetamide at a temperature of from about 400° to about 1000° C. in the presence of from 0.005 to 5.0 percent by weight, based on the amide, of a homogeneous catalyst having the formula (R'O)$_3$PO, wherein R' is an alkyl group containing from 2 to 10 carbon atoms, inclusive, said process being conducted in the vapor phase with a contact time of from about 0.1 to 30 seconds.

5. A process for the production of butyronitrile which comprises heating butyramide at a temperature of from about 400° to about 1000° C. in the presence of from 0.005 to 5.0 percent by weight, based on the amide, of a homogeneous catalyst having the formula (R'O)$_3$PO, wherein R' is an alkyl group containing from 2 to 10 carbon atoms, inclusive, said process being conducted in the vapor phase with a contact time of from about 0.1 to 30 seconds.

6. A process for the production of 2-ethylhexanonitrile which comprises heating 2-ethylhexanamide at a temperature of from about 400° to about 1000° C. in the presence of from 0.005 to 5.0 percent by weight, based on the amide, of a homogeneous catalyst having the formula (R'O)$_3$PO, wherein R' is an alkyl group containing from 2 to 10 carbon atoms, inclusive, said process being conducted in the vapor phase with a contact time of from about 0.1 to 30 seconds.

7. A process for the production of an aliphatic mononitrile which comprises heating at a temperature of from about 400° to about 1000° C. an aliphatic amide having the formula R—CONH$_2$, wherein R is an alkyl radical containing from 1 to 10 carbon atoms, in the presence of from 0.005 to 5.0 percent by weight, based on the amide triethyl phosphate, said process being conducted in the vapor phase with a contact time of from about 0.1 to 30 seconds.

8. A process for the production of an aliphatic mononitrile which comprises heating at a temperature of from about 400° to about 1000° C. an aliphatic amide having the formula R—CONH$_2$, wherein R is an alkyl radical containing from 1 to 10 carbon atoms, in the presence of from 0.005 to 5.0 percent by weight, based on the amide tributyl phosphate, said process being conducted in the vapor phase with a contact time of from about 0.1 to 30 seconds.

9. A process for the production of an aliphatic mononitrile which comprises heating at a temperature of from about 400° to about 1000° C. an aliphatic amide having the formula R—CONH$_2$, wherein R is an alkyl radical containing from 1 to 10 carbon atoms, in the presence of from 0.005 to 5.0 percent by weight, based on the amide tri(2-ethylhexyl) phosphate, said process being conducted in the vapor phase with a contact time of from about 0.1 to 30 seconds.

References Cited in the file of this patent

UNITED STATES PATENTS

| | | |
|---|---|---|
| 2,273,633 | Fluchaire | Feb. 17, 1942 |
| 2,373,190 | Kung | Apr. 10, 1945 |
| 2,526,044 | Ralston et al. | Oct. 17, 1950 |
| 2,732,397 | Hull | Jan. 24, 1956 |

FOREIGN PATENTS

| | | |
|---|---|---|
| 709,964 | Great Britain | June 2, 1954 |